July 28, 1925.

S. KACSER 1,547,331

RETORT FOR THE DISTILLATION OF BITUMINOUS MATERIALS

Filed July 19, 1921    2 Sheets-Sheet 1

INVENTOR
Soma Kacser
BY ATTORNEYS

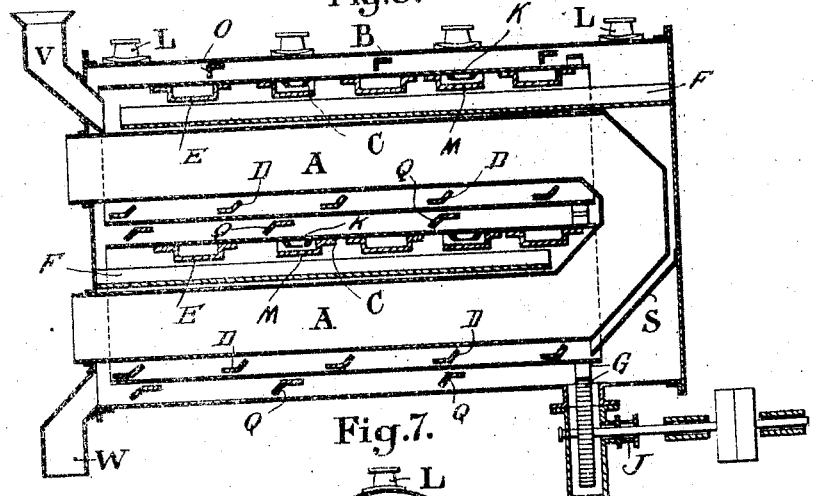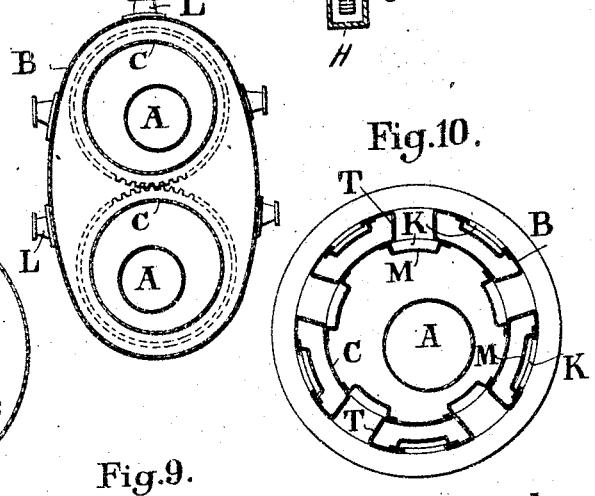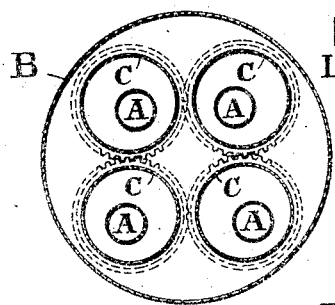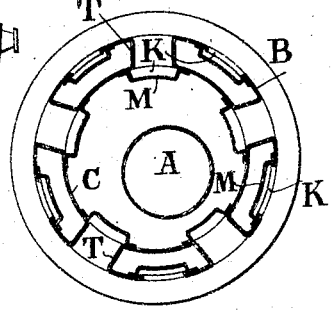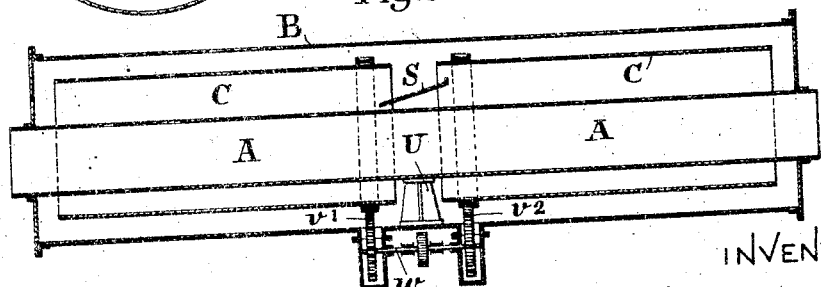

Patented July 28, 1925.

1,547,331

UNITED STATES PATENT OFFICE.

SOMA KACSER, OF BERLIN, GERMANY.

RETORT FOR THE DISTILLATION OF BITUMINOUS MATERIALS.

Application filed July 19, 1921. Serial No. 485,917.

(GRANTED UNDER THE PROVISIONS OF THE ACT OF MARCH 3, 1921, 41 STAT. L., 1313.)

*To all whom it may concern:*

Be it known that I, SOMA KACSER, a citizen of Czechoslovakia, residing at Berlin, Germany, have invented certain new and useful Improvements in a Retort for the Distillation of Bituminous Materials (for which I have filed application in Germany, July 3, 1920), of which the following is a specification.

The present invention relates to a retort for the distillation of bituminous materials, such as slate, rock asphalt, lignite, peat and the like, as well as other distillable materials allowing an excellent utilization of the employed heat, a higher yield of the highly valuable oils and a greater charging capacity, being of simple construction, thus giving an easy accessibility to all parts of the apparatus. A jamming, clogging, or caking of the material is prevented as the said material is continuously and thoroughly mixed and all particles brought into contact with the heated walls of the apparatus. The distilled gases are immediately conducted from the gasifying zone into cooler surroundings, to prevent secondary decomposition, to which especially the constituents of tar of a higher boiling point are subject, and which are very valuable as lubricants. A very important feature is that only a thin layer of material is accumulated on those zones where the most vigorous production of gases or vapours takes place, so that practically no mechanical resistance opposes the escape of the before mentioned products. Further, the possibility of introducing steam at these zones for assisting the distillation and also for discharging the hot distillation residues is conducted in such a manner that a further utilization of heat may result. The invention consists of an open ended rotary cylinder arranged within an outer casing and surrounding a stationary internal heating tube, whereby the material is carried through the said rotary cylinder in such a manner that it will cover the aforesaid heating tube.

In the accompanying drawings several constructions of the invention are illustrated.

Fig. 6 is a longitudinal section of an arrangement of two retort units in a single outer casing.

Fig. 7 is a cross section centrally of Fig. 6.

Fig. 8 is a cross section similar to Fig. 6 showing four retort units in a single outer casing.

Fig. 9 is a longitudinal cross section similar to Fig. 1 showing a tandem arrangement of two retort units.

Fig. 10 is a cross section of a double rotary cylinder.

Figure 1:
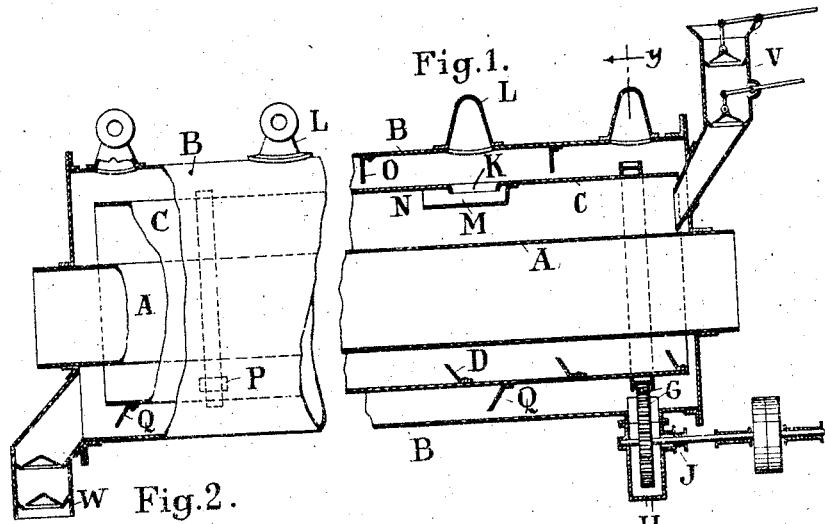
Fig. 1 is a side elevation partly in section illustrating one form of the improved retort.

The apparatus (Fig. 1) consists of a stationary outer casing B provided with a heating tube A and a cylinder C open at both ends and rotatably mounted between the heating tube A and the outer casing B. The materials to be distilled are fed into the cylinder C where they accumulate around the heating tube by means of a feeding device V which prevents any escape of gases during the charging, the said feeding device V being arranged on one end plate of the outer casing B.

Figure 4:
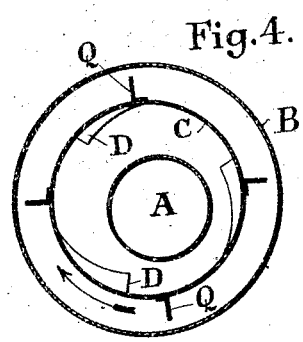
Fig. 4 is a cross section through the rotary cylinder of a further modification.
Figure 5:
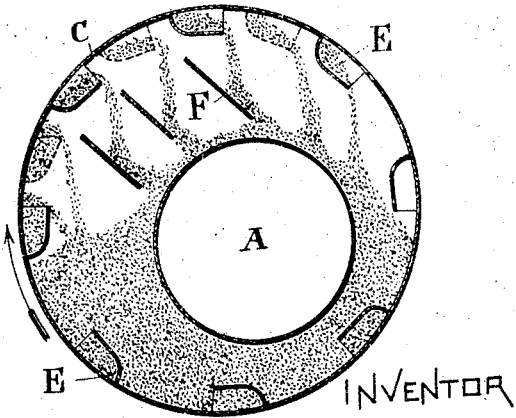
Fig. 5 is a cross section through the rotary cylinder on a larger scale of a still further modification.

By mounting the apparatus at an inclination or by means of suitably shaped blades D (Figs. 1 and 4) within the cylinder C the material will be lifted, mixed and moved in a direction towards the other end plate of the casing B and may be discharged by means of a suitable and gastight discharging device W. At various places in the cylinder C instead of the blades D are shovels or buckets E (Fig. 5) provided for taking up a part of the material and allowing it to trickle on the top part of the heating tube during the rotation of the cylinder C so that this part of the heating tube will be continuously covered with fresh and moving material, furthermore the plates F may be rigidly arranged above the heating tube to secure an even spreading of the material on both sides of the heating tube, thus preventing the accumulation of the material on one side.

The rotation of the cylinder is effected by means of a driving device G, the shaft of which passing through a casing H screwed on to the outer casing B, is to be kept tight by the stuffing box J only at this place of moderate heat.

The heating gases enter the heating tube at the discharge end and escape at the feeding end of the apparatus so that the material coming from the opposite direction will be heated in a counter current, separating first the constituents of a lower boiling point and then succesively those of a higher boiling point.

The gases are now carried off at exactly the zones where they are produced in such a manner that they will not come into contact with the hot walls of the apparatus. The rotary cylinder C has a series of openings K, the centers of which are at the periphery of the cylinder and opposite to them at their outer casing there are arranged one or several ducts L. To prevent the material from falling out through the opening at the lower positions of these openings they are provided with hoods M open in the direction of the discharge (N), thus preventing the escape of material, but not hindering the escape of the gases or vapors.

Figures 2, 3:
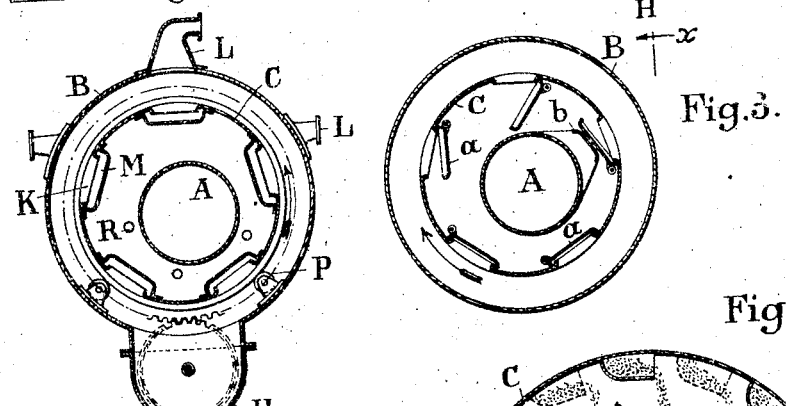
Fig. 2 is a cross section of Fig. 1 on the line *x—y*.
Fig. 3 is a cross section through the rotary cylinder of an alternative construction.

This could also be accomplished if instead of the hoods flaps a are used (Fig. 3), opening during their upward movement by their own weight and being closed during their downward movement by a cam b, and then kept closed by the weight of the material.

The distilled gases or vapors escape by the shortest way through the openings N and K from the rotary cylinder, flowing between the walls of this cylinder and the outer casing passing thereby only over a short distance and only through cooler zones and are then conducted through the ducts L to the place of condensation.

The annular divisions O arranged within the outer casing render the mixing of the gases produced in the various zones very difficult, so that already here a certain fractionation of the distillates is obtained.

The rotary cylinder C is mounted on two sets of rollers P arranged laterally on the outer casing B. The rotary cylinder is secured against lateral movements either by flanges on the driving wheel G or by guiding rings arranged on the cylinder near to the driving wheel, so that the cylinder will be able to expand in any direction. A jamming or warping is therefore prevented, and this the more, as the cylinder is not directly exposed to the heat of the heating gases; further no deformation will be caused by pressure or vacuum as the cylinder is not hermetically closed.

When using very dusty material, the dust will be firstly separated from the gases by the various openings and surfaces of the blades, buckets and rings within the cylinder, and will then be separated between the inner and outer walls as the result of the change of direction and the enlarged space between the outer casing and the rotary cylinder whereby a lower gas velocity will result. The inclined plates Q arranged on the outer wall of the rotary cylinder causes the movement of the separated dust particles towards the discharge end where they will be expelled, together with the other residues.

An essential advantage results from the excentric arrangement of the heating tube, whereby accumulation of the material will be prevented, owing to the increasing of the space in the direction of rotation, which results in less friction and therefore easier running.

The arrangement of perforated steam pipes R passing in the usual manner through the front side of the outer casing and being fixed along the heating tube facilitate the action of the steam on those places which result from the quality of the raw materials.

The advantages of the present invention in contradistinction to existing apparatus of this kind are many. Especially there are obtained the advantages mentioned above. Further there is to be set forth the absence of large stuffing boxes which in previous constructions have been always situated in hot zones and have been of such dimensions that keeping tight has been very difficult. In addition the high cost of installation and upkeep of such constructions are minimized. In the present invention the only existing stuffing box which is on the driving shaft is of such small dimensions and is situated in a cool zone that no difficulties in keeping it tight occur.

The utilization of heat is as perfect as possible and radiation of heat almost prevented, due to the fact that the rotary cylinder is surrounded by the distilled gases or vapors, which as a bad heat conductor, have an insulating effect and because the outward insulation of the outer casing secures an almost absolute concentration of the heat in the inner.

The distilled gases or vapors meet with no resistance in the comparatively thin layer of material which is in continuous movement and the gases or vapors can also escape from the lower parts of material through the various openings which will result in a quicker distillation.

The continuous and intimate contact of the material with the heating tube, the absolute possibility of regulation of the heating gases in accordance with the velocity of movement of the material as well as the possibility of direct steam supply at various zones, results in a practically complete utilization of the heat, as well as in the highest possible efficiency.

The intensive action of the heating surface in the new invention allows a shorter construction of the apparatus. As the length of the apparatus depends on the length of the path of the heating gases, i. e. the utilization of the same until the chimney temperature is reached, it is not advisable to go below a certain constructive length, but rather increase the charge.

As none of the walls of the apparatus are exposed to excessive heat, except the heating tube, the durability of the apparatus is not only increased, but also the thickness of the plates of which it is composed may be much less than in apparatus with external heating.

One form of construction of this invention consists in the arrangement of two or more heating tubes one above the other, or above and side by side, as shown in the Figs. 6-8. By this means the constructive length of the apparatus is considerably shortened and a still more intensive utilization of the heat obtained, as the cooling outer surfaces are considerably reduced. The heating takes place from below upwards, the charging being made at the top and the discharging at the bottom of the apparatus.

In Fig. 6 the material is brought from one rotary cylinder to the other one by means of a slide S.

A further modification is illustrated in Fig. 10 in which the rotating cylinder is made as a double cylinder, the outer cylinder is provided with the same devices; i. e., gas openings, guide blades, as the inner cylinder. The gas openings K of the inner cylinder are connected with the outer cylinder by means of the tubular connections T. Charging takes place in the interspace where the material is preheated and the lower volatile constituents gasified. The material is then brought into the inner cylinder by means of slides (not shown) where the further gasifying is completed.

In apparatus of very great length it is necessary to divide the rotary cylinder in two parts arranged in tandem fashion (Fig. 9) and to provide a support U for the heating tube, in this case the driving of the cylinders may be effected from one single shaft $w$ and toothed wheels $v^1$ and $v^2$.

I claim:

1. In an apparatus of the character described, the combination of a stationary outer casing, a rotary cylinder within said casing driven from without said casing by an enclosed gear, a stationary internal heating tube within said cylinder, said rotary cylinder being provided with a series of openings in the periphery thereof; and a series of ducts leading from said outer casing, said ducts being arranged opposite said openings whereby the distilled vapors may escape directly from the heating zones.

2. In an apparatus of the character described, the combination of a stationary outer casing, a rotary cylinder within said casing driven from without said casing by an enclosed gear, a stationary internal heating tube within said cylinder, said rotary cylinder being provided with a series of openings on the periphery thereof; a series of ducts opposite said openings and a plurality of annular divisions between said ducts for preventing the mixing of the vapors produced at different parts of the apparatus.

3. In an apparatus of the character described, the combination of a stationary outer casing, a rotary cylinder within said casing, driven from without said casing by an enclosed gear, a stationary internal heating tube within said cylinder, and means for carrying off the distilled vapors from the zones of production consisting of a series of openings provided in the periphery of said rotary cylinder and means for preventing the escape through these openings of the material being treated.

4. In an apparatus of the character described, the combination of a stationary outer casing, a rotary cylinder within said casing driven from without said casing by an enclosed gear, a stationary internal heating tube within said cylinder and means for carrying off the distilled vapors from the zones of production consisting of a series of openings provided in the periphery of said rotary cylinder and a plurality of hoods covering said openings, said hoods being open in the direction of movement of the material being treated.

5. In an apparatus of the character described, the combination of a stationary outer casing, a rotary cylinder within said casing driven from without said casing by an enclosed gear, a stationary internal heating tube within said cylinder, and means for lifting the material treated and distributing it over the surface of the heating tube.

6. In an apparatus of the character described, the combination of a stationary outer casing, a rotary cylinder within said casing driven from without said casing by an enclosed gear, a stationary internal heating tube within said cylinder, means for carrying off the distilled vapors from the zones of production consisting of a series of openings provided in the periphery of said rotary cylinder, and means for preventing the escape through these openings of material being treated; means for lifting the material treated and distributing it over the surface of the heating tube.

7. In an apparatus of the class described, the combination of a stationary outer casing, two rotary cylinders within said outer casing, a U-shaped internal heating tube extending through said rotary cylinders, means for introducing material discharged from one of said rotary cylinders into the other, and enclosed means for driving said rotary cylinders from without said outer casing.

In testimony whereof I have affixed my signature in presence of two witnesses.

SOMA KACSER.

Witnesses:
PAUL MASCOW,
ADOLF FACKET.